Nov. 19, 1935.  N. P. BILLING  2,021,765
CAMERA
Filed Oct. 23, 1934  3 Sheets-Sheet 1
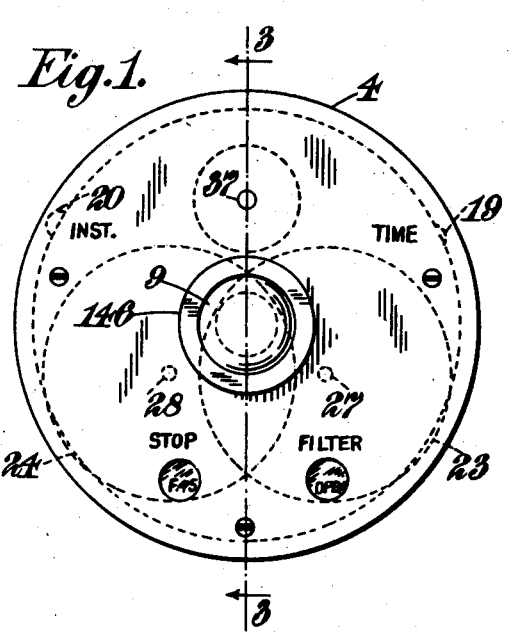
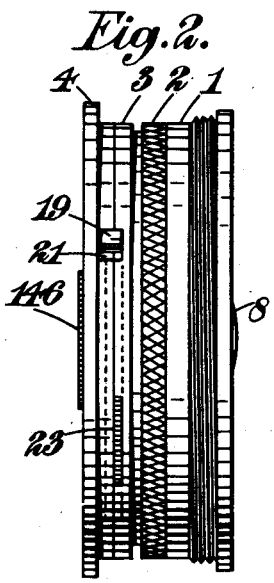
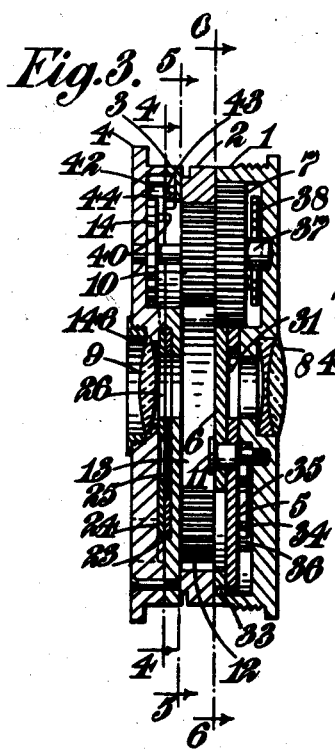
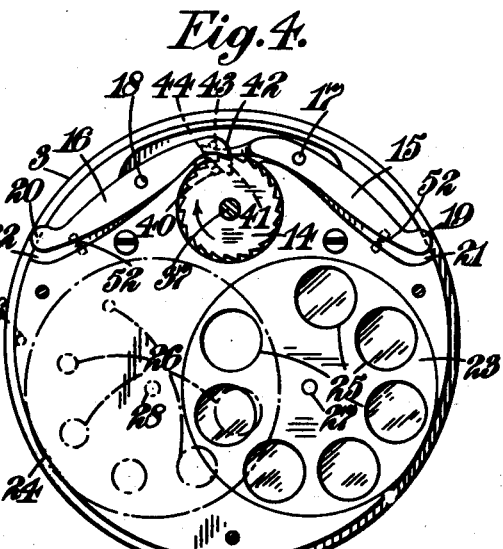
Inventor:
Noel Pemberton Billing,
By Byrnes, Stebbins & Blenko,
attys Nov. 19, 1935.  N. P. BILLING  2,021,765
CAMERA
Filed Oct. 23, 1934  3 Sheets-Sheet 2
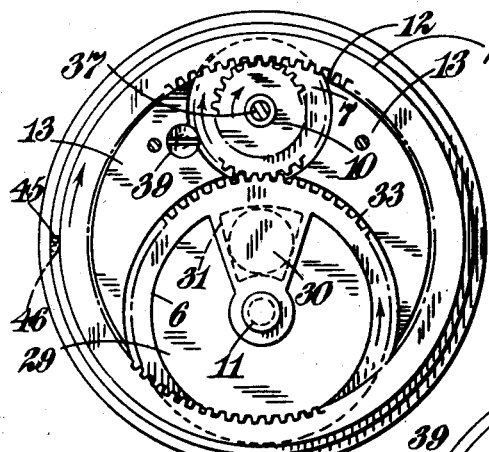
Fig.5.
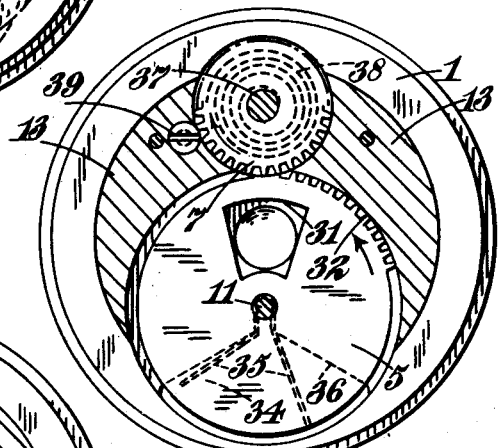
Fig.6.
Fig.7.
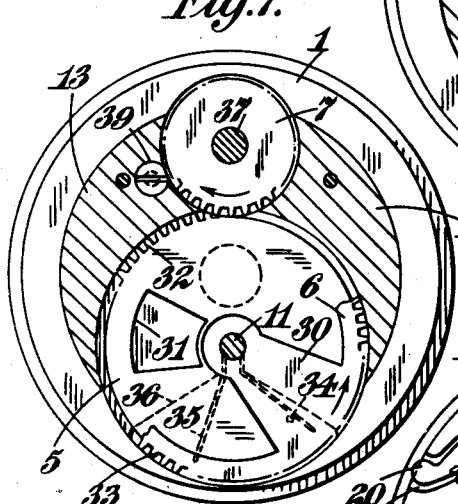
Fig.8.
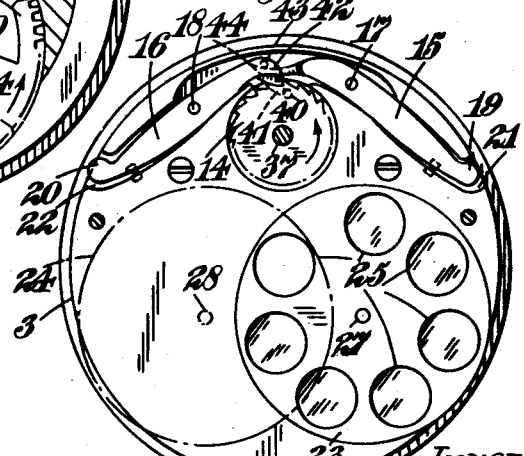
Inventor
Noel Pemberton Billing
by Byrnes, Stebbins & Blenko
attys

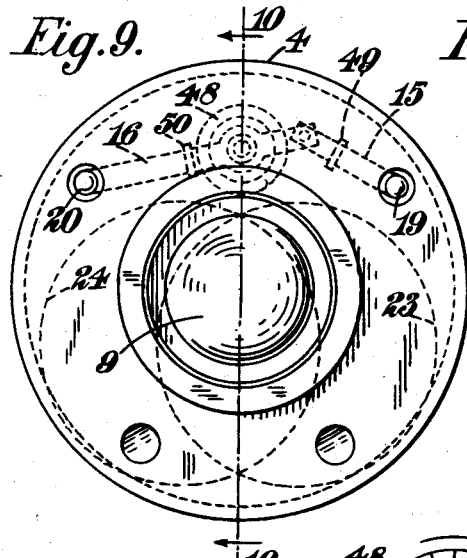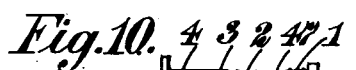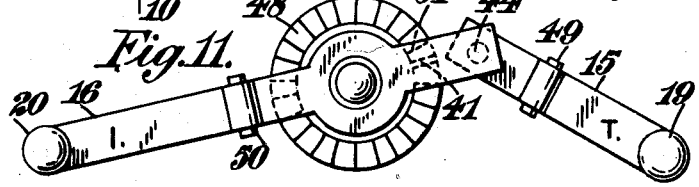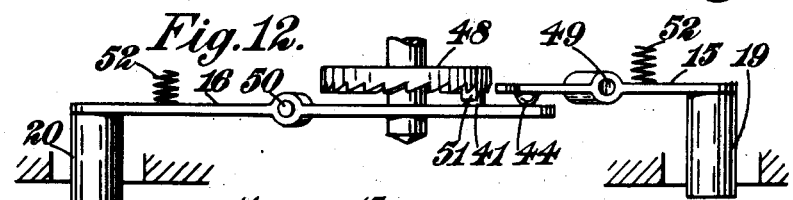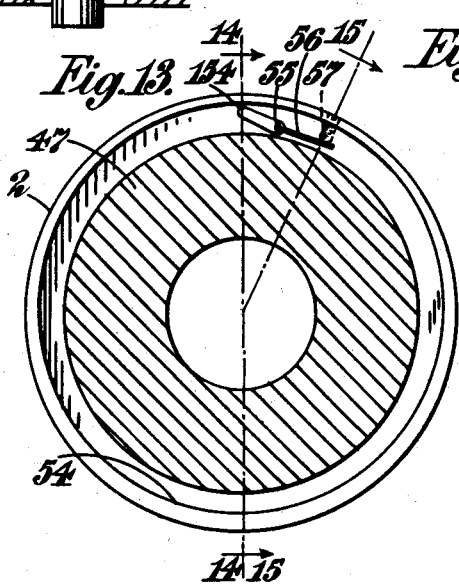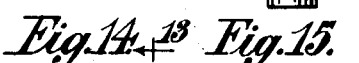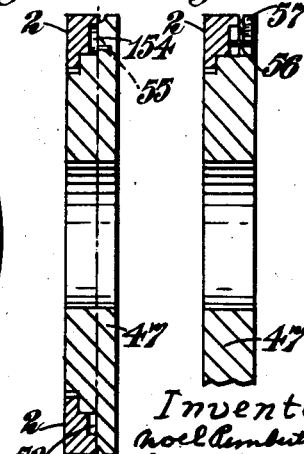

Patented Nov. 19, 1935

2,021,765

UNITED STATES PATENT OFFICE 2,021,765

CAMERA

Noel Pemberton Billing, London, England

Application October 23, 1934, Serial No. 749,653
In Great Britain November 3, 1933

26 Claims. (Cl. 95—60)

This invention consists in improvements in or relating to cameras and is directed particularly to an improved shutter mechanism and camera front containing that mechanism.

According to the present invention a shutter mechanism comprises two leaves relatively movable to one another, one of the leaves having in it an exposure aperture and the other serving as a closure member therefor in combination with shutter-release means for moving the two leaves through different distances.

Preferably the release means serves to produce a relatively small movement of the two leaves in company to be followed by a further movement of one leaf alone. Thus the movement of the two leaves in company may serve first to bring the apertured leaf into a position relatively to the lens to open the latter and the further movement of the companion leaf will subsequently serve to close that aperture, the period of exposure thus depending upon the time taken for the companion leaf to travel the distance necessary to bring it to the closure position.

Means is provided for varying the difference in the distances to be travelled by the two leaves. Conveniently the two leaves are rotatable about a single axis and the relative setting of the two leaves is obtained by a relative angular separation of the aperture in one leaf and the closure portion of the other.

The operating or releasing mechanism, in one form of the invention, comprises a mutilated gear element on one leaf, a complete gear element on the other over that portion of it corresponding to its full movement, and a gear member, which is preferably a driving gear member, engages both gear elements simultaneously. Thus, by turning the driving gear element in one direction (the shutter setting direction) the mutilated gear element on the first-named leaf will cause the latter to move only to a limited extent whereupon the gear element becomes disengaged and further movement of the driving gear member in the same direction continues to move the second-mentioned leaf. Consequently, while by this setting movement the apertured leaf may be turned about its axis to move its aperture from the open to the closed position in relation to the lens, the second or closure leaf may have its movement continued so as to carry its closure portion to any predetermined angular distance beyond the aperture in the companion leaf. On release of the driving gear member the two leaves will first be returned together, the mutilated gear permitting the first-named leaf to return to the exposure position, and continued movement will cause the second or shutter leaf eventually to be returned to a position to close the aperture in the first-named leaf, the time interval between the opening and closing of the lens being determined by the angular separation of the two leaves.

Alternatively, in place of angular movement of the leaves linear movement may be employed, and the gear elements associated with the leaves will then be in the form of racks.

For returning the leaves on release of the shutter mechanism a spring is preferably employed operating through the driving gear element, the setting movement of the latter serving to wind the spring. It is also preferred to provide a spring tending always to maintain the end of the mutilated gear in a position for immediate engagement with the driving gear member at all times. Any preferred stop or catch or like means may be employed to hold the driving gear member in its set position prior to release.

In order that the invention may be more clearly understood a preferred example will now be described with the aid of the accompanying drawings, in which:—

Figure 1 is an elevation of the camera front looking at it from the front,

Figure 2 is a side elevation of the camera front looking from the right in Figure 1, Figure 3 is a section on the line 3—3 of Figure 1, Figure 4 is a section on the line 4—4 of Figure 3, Figure 5 is a section on the line 5—5 of Figure 3 showing the shutter leaves in their normally closed position, Figure 6 is a section on the line 6—6 of Figure 3 with one shutter leaf removed, Figure 7 is a similar view to Figure 6 showing both shutter leaves partially turned in a shutter setting movement, Figure 8 is a view similar to Figure 4 showing the parts in positions for making time exposures, Figure 9 is a view similar to Figure 1 of a modified construction, Figure 10 is a section on the line 10—10 of Figure 9, Figure 11 is a detail on an enlarged scale of the shutter release mechanism shown in Figures 9 and 10, Figure 12 is a view looking from above of the parts shown in Figure 11, Figure 13 shows a form of brake for checking the return speed of a shutter leaf, Figure 14 is a section on the line 14—14 of Figure 13, and Figure 15 is a section on the line 15—15 of Figure 13.

Like reference numerals indicate like parts in the several figures of the drawings.

In the form illustrated in Figures 1 to 8 a camera front, for example a front section for the camera body described in the British Specification No. 20322/33, is alone illustrated; and it is to be understood that the front may be used not only with the camera body above referred to but with any body to which it may be desired to fit such a front.

The front comprises four concentrically arranged sections 1, 2, 3 and 4 which are secured together in a manner to be described later, so that they are light-tight. The rear section 1 is in the form of a flanged disc recessed to accommodate two shutter leaves 5 and 6 and a pinion 7. Secured on a central aperture in the section 1 is a rear lens element 8 of a combination lens, the front element 9 of which is carried in an aperture situated centrally in the front section 4.

The adjacent section 2 accommodates a further pinion 10 and is itself formed as a ring having internal gear teeth 12 around the inner periphery. The ring is centered on cheek pieces 13 secured to or formed integrally with the rear section 1 and extending from the inner surface of the latter. The teeth 12 mesh with the teeth of pinion 10.

Sections 3 and 4 together afford recesses for housing a ratchet wheel 14 and pawls 15 and 16. The latter are pivoted in the front wall of section 4 at 17 and 18 respectively and are formed with operating knobs 19 and 20 which project through the cylindrical wall of section 1 through slots 21 and 22 (Figure 8) provided for that purpose. The sections 3 and 4 also together afford accommodation for two discs 23 and 24 of which the disc 23 serves to carry a plurality of light filters 25 and the disc 24 is apertured at 26 to afford a plurality of stops. The disc 23 is mounted on a pivot pin 27 and the disc 24 on a pivot pin 28 held in either one or both of the sections 3 and 4.

The shutter leaves are mounted on a pivot 11 having a screw-threaded extremity taking into the circular face of section 1 as clearly shown in Figure 3. The outer end of the pivot 11 is flanged to retain the leaves 5 and 6 in position while allowing them sufficient freedom for rotation on the pivot.

The leaf 6 is shown most clearly in Figure 5 and comprises a ring gear having a large aperture 29 and a relatively small solid sector 30 and the inner end of which embraces the pivot pin 11. The leaf 5 has in it a sector-shaped aperture 31 which, when the two leaves are in the closed position of Figure 5, is covered by the sector 30 to prevent passage of light through the lens system into the camera. On the periphery of the leaf 5 are gear teeth 32 extending over only a small arc of the periphery and comprising the mutilated gear already mentioned. The teeth 32 and the teeth 33 of the ring gear on the leaf 6 both mesh with the teeth of pinion 7. Extending to the rear from the leaf 5 is a pin 34 which is located between the arms of a hairpin spring 35 as shown most clearly in Figure 6. The loop of the spring is supported on a reduced neck of the pivot pin 11 and is received in a sector-like recess 36 provided for its accommodation in the section 1.

The pinions 7 and 10 and the ratchet wheel 14 are all secured to and rotatable with a spindle 37 mounted at its opposite extremities in bearing recesses in sections 1 and 4. One end of a coiled spring 38 is anchored to the spindle 37 and the other end is anchored at 39 (Figure 6) to the section 1.

A pin 40 projecting rearwardly from the surface of the ratchet wheel 14 near its periphery can be engaged by a tooth 41 at the end of the pawl 16. A second tooth 42 on that pawl engages the teeth of the ratchet wheel 14. A pin 43 extending rearwardly from the pawl 16 is engaged by the extremity 44 of the pawl 15.

The filter and stop discs 23 and 24 have small portions of their peripheries projecting through slots formed for that purpose in the cylindrical walls of sections 3 and 4. The arrangement and operation of these slots is similar to that described in British Specification No. 20966/34.

The operation of the mechanism so far described is as follows:—

In order to set the shutter the ring 2 is rotated clockwise as viewed in Figures 1, 5, 6, 7 and 8, the edge of the ring 2 being knurled to facilitate its manipulation. Rotation of ring 2 rotates pinion 10 in the direction of the arrow shown in Figure 5 and also rotates pinion 7 and ratchet wheel 14 in a similar direction. Pinion 7 rotates both shutter leaves but owing to the mutilated gear 32 the leaf 5 will only receive a partial rotation from the position shown in Figure 6 to that in Figure 7. The leaf 6 can be rotated to any desired extent thus imparting an adjustable angular separation between the two leaves to carry the segment 30 any desired angular distance past the aperture 31. A pin 45 on the ring 2 and a co-operating stop pin 46 on section 3 serves to limit the angular movement of ring 2 substantially one complete revolution as a maximum. As the ring 2 is turned spring 38 is wound and tends to return the parts to their initial positions but this is prevented by engagement of the ratchet teeth of the wheel 14 with the pawl tooth 42.

For instantaneous exposure the knob 20 is fully depressed so as to release the ratchet 14 and to remove pawl tooth 41 from the path of pin 40. The length of exposure will depend upon the angular separation given to the leaves of the shutter. On release the leaf 5 will return to the position of Figure 6 to bring the aperture 31 in register with the lens aperture and the exposure will be complete when the leaf 6 has turned to the position of Figure 5 so that the sector 30 covers the aperture 31.

The ratio of the gearing is such that one complete revolution of the ring 2 rotates pinions 7 and 10 and the ratchet wheel 14 substantially four times thereby rotating the leaf 6 twice. The maximum instantaneous exposure will be obtained when the ring 2 has been fully wound. The sector 30 will pass across the aperture 31 during its first revolution but the length of time occupied in this momentary closure is so small as to be negligible.

For time exposure the ring 2 is given a semi-rotation and this will be adjusted by setting the pin 45 against an index mark on the edge of section 3. The effect of this movement is to carry the pin 40 from its position of rest (Figure 4) twice beneath the pawl tooth 41 back again to the position of Figure 4. Release is now effected by depressing knob 19 which rocks pawl 15 about its axis 17 and raises its end 44 to lift pin 43 and rock pawl 16 about its axis 18. The position of the pivot 17 is such that this movement will only serve to release the tooth 42 from the teeth of the ratchet 14, whereupon leaf 5 will be returned to the position of Figure 6 and leaf 6 will accompany it for a portion only of the travel of leaf 6 until the pin 40 engages behind the tooth 41 as shown in Figure 8. The leaf 6 is arrested in a position substantially half way round so that the sector 30 is almost diametrically opposite the aperture 31 and closure of the shutter will not be effected until knob 20 is depressed to release the ratchet 14. Upon release of the ratchet, leaf 6 will then return to the position of Figure 5 and exposure will be completed.

It will be observed that the action of the spring 35 is always to hold the end tooth of the mutilated gear 32 resiliently in engagement with the teeth of pinion 7 ready for immediate movement by that pinion.

A sleeve 146 screwthreaded into the front of section 4 may be withdrawn by unscrewing it to serve as a hood for the lens.

In the construction illustrated in Figures 10 to 12 the general co-operation of the parts is similar to that already described except that the arrangement of some of those parts is different and the shutter release mechanism is modified. It will be seen that ring 2 only partially overhangs pinion 10 and receives a bigger bearing on bearing surfaces afforded by another disc 47 introduced between sections 1 and 2. The disc or section 47 serves also partially to house pinion 10 and entirely to house pinion 7. The shutter leaves 5 and 6 are now arranged in rear of the rear lens element 8 and the discs 23 and 24 only are interposed between front and rear lens elements.

Instead of the ratchet wheel 14 a crown wheel 48 is now employed with its teeth facing to the front. Pawls 15 and 16 are now mounted on pivots 49 and 50 the axes of which are in planes at right angles to those of the pawls 15 and 16 of the previous construction. Consequently the pawls are actuated by means of press knobs 19 and 20 exposed in the front face of section 4. One of the teeth of the crown wheel as shown at 51 is longer than the others and plays the part of pin 40 of the previous construction. Otherwise the action of the release mechanism is similar to that already described and, as will be seen from Figure 12, the pawl tooth 41 now projects inwardly towards the teeth of the crown wheel 48.

In both constructions pawls 15 and 16 are urged outwardly by springs 52 causing the pawl tooth 41 to be resiliently urged towards the co-operating ratchet teeth. In the second construction the pin 43 will not be required as the nose 44 presses directly against the end of pawl 16.

If it is found desirable to check the return speed of the shutter after release the modification illustrated in Figures 13 to 15 may be employed. In these figures only the ring section 47 and the section 2 are illustrated. They are now so shaped as to afford a recess 53 in which the outer wall 54 of the recess, i. e., that wall of it afforded by the section 2, is eccentric with respect to the inner wall. A brake cam 154 pivoted at 55 has a resilient tail 56 in the form of a short length of spring, the tension of which is adjustable by means of the grub screw 57. The brake cam 154 lies inclined across the recess 53 in such a position that at the beginning of the release movement of the shutter little or no braking occurs until the leaves have moved to the position of Figure 6. After this angular distance of travel has taken place the eccentricity of the wall 54 causes the latter to engage the brake cam thus checking the return movement of leaf 6 to the required degree.

The invention is not limited to the precise details of construction, for instance, instead of providing a mutilated gear on one of the leaves a check mechanism may be employed to limit its movement in any preferred manner and to drive it on release by means other than the driving gear member described hereinbefore.

Moreover, the means for retarding the return of the closure leaf may be modified from that described with reference to Figure 13.

Also the invention is not limited to a construction in which the lens-controlling portions of the leaves are in planes transverse to the axis of the lens. The term "leaf" is to be understood, therefore, to include any shutter member which will fulfil a function corresponding to that of the shutter leaf 5 or 6 described herein.

I claim:—

1. Camera shutter mechanism comprising in combination a pair of movably mounted shutter components, the first of which has in it an exposure aperture and the second of which normally serves as a closure member for said aperture, a shutter setting element operatively connected in common to both shutter components, said operative connection providing lost motion between said setting element and the first-named shutter component only after a limited initial setting movement of the latter has occurred, whereby the two shutter components are movable through different distances, and releasable means to retain said components in the positions to which they are thus set.

2. Camera shutter mechanism comprising in combination a pair of movably mounted shutter components, the first of which has in it an exposure aperture and the second of which normally serves as a closure member for said aperture, a shutter setting element operatively connected in common to both shutter components, said operative connection providing lost motion between said setting element and the first-named shutter component only after a limited initial setting movement of the latter has occurred, whereby the two shutter components are movable through different distances, means to retain said components in the position to which they are thus set, and a shutter release device operable after actuation of the setting element to permit, in a direction opposite to that of the setting movement, of a relatively small movement of the two shutter components in company followed by a further movement of the second component alone.

3. Camera shutter mechanism according to claim 1 in which the shutter setting element is operable to variable extents for the purpose of separating the shutter components to distances which are also variable and are dependent upon the exposure period desired.

4. Camera shutter mechanism comprising in combination a pair of shutter components rotatable about fixed axes, the first component having an exposure aperture and the second normally serving as a closure member of said aperture, a shutter setting element operatively connected in common to both shutter components, said operative connection providing lost motion between said setting element and the first-named shutter component only after a limited initial setting movement of the latter, whereby the two shutter components are movable through different angular distances, and releasable means to retain said components in the positions to which they are thus set.

5. Camera shutter mechanism comprising in combination a pair of shutter components rotatable about an axis common to them both, the first component having an exposure aperture and the second normally serving as a closure member for said aperture, a shutter setting element operatively connected in common to both shutter components, said operative connection providing lost motion between said setting element and the first-named shutter component only after a limited initial setting movement of the latter, whereby the two shutter components are movable through different angular distances, and releasable means to retain said components in the positions to which they are thus set.

6. Camera shutter mechanism comprising in combination a pair of movably mounted shutter components the first of which has in it an exposure aperture and the second of which normally serves as a closure member for said aperture, a mutilated gear element movable with said first shutter component, a gear element movable with said second shutter component and capable by operation of a setting element of imparting greater movement to the latter than the movement which can be transmitted to the first component through the mutilated gear element, and a setting element comprising a gear member to engage both gear elements simultaneously.

7. Camera shutter mechanism comprising in combination a pair of shutter components rotatable about fixed axes, the first component having an exposure aperture and the second normally serving as a closure member for said aperture, a mutilated gear element rotatable with the first shutter component, a gear element rotatable with the second shutter component and capable of transmitting by operation of a setting element a greater movement to the second shutter component through the mutilated gear element, and a setting element comprising a gear member to engage both gear elements simultaneously.

8. Camera shutter mechanism according to claim 6 and combined with driving means for the gear member, means operatively connecting the driving means with the gear member such that movement of the latter during setting will energize the driving member, and a shutter release device operatively coupled to the gear member.

9. Camera shutter mechanism comprising in combination a pair of shutter components rotatable about fixed axes, the first component having an exposure aperture and the second normally serving as a closure member for said aperture, a mutilated gear element rotatable with the first shutter component, a gear element rotatable with the second shutter component and capable of transmitting by operation of a setting element a greater movement to the second shutter component than that which can be transmitted to the first shutter component through the mutilated gear element, a setting element comprising a gear member to engage both gear elements simultaneously, and means operatively connecting the driving means with the gear member such that movement of the latter during setting will energize the driving member, and a shutter release device operatively coupled to the gear member.

10. Camera shutter mechanism comprising in combination a pair of shutter components of disc form which are disposed to lie and move in planes transverse to the axis of the camera lens each about an axis parallel to that of the camera lens, the first component having an exposure aperture and the second normally serving as a closure member for said aperture, a shutter setting element operatively connected in common to both shutter components, said operative connection providing lost motion between said setting element and the first-named shutter component only after a limited initial setting movement of the latter, whereby the two shutter components are movable through different angular distances, and releasable means to retain said components in the positions to which they are thus set.

11. Camera shutter mechanism comprising in combination a pair of shutter components of disc form that are disposed to lie and move in planes transverse to the axis of the camera lens about an axis common to them both and parallel to that of the camera lens, the first component having an exposure aperture and the second normally serving as a closure member for said aperture, a shutter setting element operatively connected in common to both shutter components, said operative connection providing lost motion between said setting element and the first-named shutter component only after a limited initial setting movement of the latter, whereby the two shutter components are movable through different angular distances, and means to retain said components in the positions to which they are thus set.

12. Camera shutter mechanism comprising in combination a pair of shutter components rotatable about a fixed axis, the first component having an exposure aperture and the second normally serving as a closure member for said aperture, a mutilated gear element movable with said first shutter components, a gear element movable with said second shutter component capable of transmitting, by operation of a setting element, a greater movement to the said second component than that which can be transmitted to the first component through the mutilated gear element, a setting member comprising a gear member to engage both gear elements simultaneously, and a spring tending always to maintain the mutilated gear element in engagement at one or the other of its ends with the driving gear member.

13. Camera shutter mechanism comprising in combination a pair of shutter components rotatable about an axis common to them both, the first component having an exposure aperture and the second normally serving as a closure member for said aperture, a mutilated gear element movable with said first shutter component, a gear element movable with said second shutter component and capable, by operation of a setting element, of transmitting a greater movement to said second component than that which can be transmitted to said first component through the mutilated gear element, a setting element comprising a gear member to engage both gear elements simultaneously, and driving means for the gear member comprising a shutter driving spring to actuate the shutter components when they are released after setting.

14. Camera shutter mechanism according to claim 13 combined with a spring operatively connected with the mutilated gear element and tending always to maintain the latter in engagement at one or other of its ends with the driving gear member.

15. Camera shutter mechanism according to claim 1 in which the shutter setting element is constituted by a hand-rotatable ring gear and is combined with a shutter driving gear member meshing with the ring gear, a ratchet wheel rotatable with the gear member, a pawl for the ratchet wheel, a stop on the latter, and a cooperating releasable stop to arrest the ratchet wheel and gear member after a partial return movement has occurred.

16. Camera shutter mechanism according to claim 5 in which the shutter setting element is constituted by a hand-rotatable ring gear and is combined with a shutter driving gear member meshing with the ring gear, a ratchet wheel rotatable with the gear member, a pawl for the ratchet wheel, a stop on the latter, and a co-operating releasable stop to arrest the ratchet wheel and gear member after a partial return movement has occurred.

17. Camera shutter mechanism according to claim 6 in which the shutter setting element is constituted by a hand-rotatable ring gear which meshes with the gear member that is movable with the second shutter component, in combination with a ratchet wheel rotatable with the gear member, a pawl for the ratchet wheel, a stop on the latter, and a cooperating releasable stop to arrest the ratchet wheel and gear member after a partial return movement has occurred.

18. Camera shutter mechanism according to claim 1 in which the shutter setting element is constituted by a hand-rotatable ring gear and is combined with a shutter driving gear member meshing with the ring gear, a ratchet wheel rotatable with the gear member, a pawl for the ratchet wheel, a stop on the latter, and a cooperating releasable stop to arrest the ratchet wheel and gear member after a partial return movement has occurred, the said releasable stop and pawl being constituted by a single entity which is pivotally mounted, and a release device operative to move the pawl only out of engagement with the ratchet teeth and to leave the releasable stop in operation subject to a second and subsequent manipulation to release it.

19. Camera shutter mechanism according to claim 5, in which the shutter setting element is constituted by a hand-rotatable ring gear and is combined with a shutter driving gear member meshing with the ring gear, a ratchet wheel rotatable with the gear member, a pawl for the ratchet wheel, a stop on the latter, a cooperating releasable stop to arrest the ratchet wheel and gear member after a partial return movement has occurred, the said releasable stop and pawl being constituted by a single entity which is pivotally mounted, and a release device operative to move the pawl only out of engagement with the ratchet teeth and to leave the releasable stop in operation subject to a second and subsequent manipulation to release it.

20. Camera shutter mechanism according to claim 6 in which the shutter setting element is constituted by a hand-rotatable ring gear which meshes with the gear member that is movable with the second shutter component, in combination with a ratchet wheel rotatable with the gear member, a pawl for the ratchet wheel, a stop on the latter, a cooperating releasable stop to arrest the ratchet wheel and gear member after a partial return movement has occurred, the said releasable stop and pawl being constituted by a single entity which is pivotally mounted, and a release device operative to move the pawl only out of engagement with the ratchet teeth and to leave the releasable stop in operation subject to a second and subsequent manipulation to release it.

21. Camera shutter mechanism according to claim 1 in combination with a retarding device operable on a moving part of the shutter mechanism to delay closure thereof.

22. Camera shutter mechanism according to claim 5 in combination with a retarding device operable on a moving part of the shutter mechanism to delay closure thereof.

23. Camera shutter mechanism according to claim 6 in combination with a retarding device operable on a moving part of the shutter mechanism to delay closure thereof.

24. Camera shutter mechanism according to claim 1 combined with a retarding device operable on a moving part of the shutted mechanism to delay closure thereof, said retarding device comprising a resiliently controlled cam-like surface inclined with respect to an eccentrically disposed cooperating brake surface on a rotating part of the shutter mechanism, and the said cooperating brake surface therefor.

25. Camera shutter mechanism according to claim 1 in which the shutter components are of disc form and are formed with gear elements at their periphery, the first-named component having a mutilated gear element and the second component having a complete gear element whereby it may perform one or more complete revolutions if necessary in effecting a single exposure.

26. Camera shutter mechanism according to claim 1 in which the operative connection between the setting element and the shutter components is such as to provide lost motion between the setting element and the first-named shutter component after a limited movement of the latter in either direction.

NOEL PEMBERTON BILLING.